United States Patent
Konrad et al.

(10) Patent No.: US 7,112,316 B1
(45) Date of Patent: *Sep. 26, 2006

(54) PROCESS FOR PREPARING MOLECULAR SIEVES VIA CONTINUOUS ADDITION OF NUTRIENTS

(75) Inventors: Brian S. Konrad, Schaumburg, IL (US); Julio C. Marte, Carol Stream, IL (US); Beckay J. Mezza, Arlington Heights, IL (US); Stephen T. Wilson, Libertyville, IL (US); Lance L. Jacobsen, Lake Zurich, IL (US); David A. Lesch, Hoffman Estates, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/199,044

(22) Filed: Aug. 8, 2005

(51) Int. Cl.
*C01B 39/02* (2006.01)
*C01B 37/08* (2006.01)

(52) U.S. Cl. .................. 423/709; 423/700; 423/306; 423/DIG. 30; 502/208; 502/214

(58) Field of Classification Search ........... 423/700, 423/306, 709, DIG. 30; 502/208, 214
See application file for complete search history.

(56) References Cited

U.S. PATENT DOCUMENTS

| | | | | |
|---|---|---|---|---|
| 3,425,800 A | | 2/1969 | Hirsh ........................... 23/113 |
| 3,516,786 A | * | 6/1970 | Maher et al. ............... 423/710 |
| 3,702,886 A | * | 11/1972 | Argauer ...................... 423/705 |
| 3,781,226 A | * | 12/1973 | Schartz ........................ 502/62 |
| 3,926,782 A | * | 12/1975 | Plank et al. ................ 208/135 |
| 4,061,724 A | | 12/1977 | Grose et al. ................ 423/335 |
| 4,310,440 A | | 1/1982 | Wilson et al. .............. 252/435 |
| 4,314,979 A | | 2/1982 | Deabriges ................... 423/329 |
| 4,383,981 A | * | 5/1983 | van Erp et al. ............. 423/701 |
| 4,440,871 A | | 4/1984 | Lok et al. ................... 502/214 |
| 4,500,651 A | | 2/1985 | Lok et al. ................... 502/208 |
| 4,606,901 A | * | 8/1986 | Chu et al. ................... 423/716 |
| 4,642,226 A | * | 2/1987 | Calvert et al. ............. 423/706 |
| 4,801,476 A | * | 1/1989 | Dunsmuir et al. ...... 427/430.1 |
| 5,242,675 A | * | 9/1993 | Verduijn ..................... 423/700 |
| 5,318,766 A | * | 6/1994 | Vaughan et al. ............ 423/700 |
| 5,389,358 A | | 2/1995 | Wu et al. .................... 423/718 |
| 5,672,331 A | * | 9/1997 | Verduijn ..................... 423/702 |
| 6,773,694 B1 | | 8/2004 | Lesch et al. ................ 423/709 |
| 2004/0047803 A1 | * | 3/2004 | Valtchev et al. ........... 423/716 |

OTHER PUBLICATIONS

Cundy, C.S., Henty, M.S. and Plaisted, R.J., *Zeolite Synthesis Using a Semicontinuous Reactor, Part 1: Controlled Nucleation and Growth of ZSM-5 Crystals Having Well-Defined Morphologies*, Zeolites 15: 353-372, 1995.

Cundy, C.S., Henty, M.S. and Plaisted, R.J., *Zeolite Synthesis Using a Semicontinuous Reactor, Part 2: Synthesis at High Nucleation Rates*, Zeolites 15: 400-407, 1995.

* cited by examiner

*Primary Examiner*—David Sample
(74) *Attorney, Agent, or Firm*—John G. Tolomei; Frank S. Molinaro

(57) ABSTRACT

A process for synthesizing a variety of molecular sieves has been developed. The process involves forming a reaction mixture comprising reactive sources of the framework elements plus at least one templating agent, reacting the mixture to at least partially crystallize the molecular sieve and provide a slurry of seed crystals and adding to it nutrients (sources) of the framework elements, e.g. aluminum and silicon in order to grow the seed crystals. The rate of addition of the nutrients is controlled such that it is substantially the same as the crystal growth rate and such that there is substantially no nucleation of new crystals. The seed crystals may be the same or different than the nutrients being added, thus allowing for a layered molecular sieve. When the crystals have reached a desired size, they are isolated by conventional techniques.

43 Claims, No Drawings

PROCESS FOR PREPARING MOLECULAR SIEVES VIA CONTINUOUS ADDITION OF NUTRIENTS

FIELD OF THE INVENTION

This invention relates to a process for synthesizing molecular sieves. More specifically, the process involves preparing a reaction mixture comprising reactive sources of the framework elements, templating agents and water, at least partially crystallizing the desired molecular sieves and then adding nutrients (sources) of the framework elements, e.g. aluminum and silicon, and optionally templating agents at a rate to grow the molecular sieve crystals.

BACKGROUND OF THE INVENTION

Molecular sieves of the crystalline aluminosilicate zeolite type are well known in the art, and now comprise over 150 species of both naturally occurring and synthetic zeolites. In general, the crystalline zeolites are formed from corner-sharing $AlO_2$ and $SiO_2$ tetrahedra and are characterized by having pore openings of uniform dimensions, having a significant ion-exchange capacity and being capable of reversibly desorbing an adsorbed phase which is dispersed throughout the internal voids of the crystal without significantly displacing any atoms which make up the permanent crystal structure.

Other crystalline microporous compositions are known which are not zeolitic but which exhibit the ion exchange and/or adsorption characteristics of the zeolites. These include: 1) a pure silica polymorph, silicalite, having a neutral framework containing neither cations nor cation sites as disclosed in U.S. Pat. No. 4,061,724; 2) crystalline aluminophosphate compositions disclosed in U.S. Pat. No. 4,310,440; 3) silicon substituted aluminophosphates as disclosed in U.S. Pat. Nos. 4,440,871 and 4) titanium substituted aluminophosphates as disclosed in U.S. Pat. No. 4,500,651.

Molecular sieves are usually hydrothermally synthesized from a reaction mixture in a batch reactor. In this type of process, all ingredients are added to a reactor thereby forming a gel. The gel is next stirred and heated for a sufficient time to crystallize the zeolite. The drawbacks to a conventional process include limitations on the control of size and morphology of crystals, limitations on the solids content, generation of waste products which can't be recycled and large capital investments. Accordingly, the industry is continuously conducting research to improve the manufacture of molecular sieves.

For example, U.S. Pat. No. 4,314,979 discloses a continuous process for preparing zeolite A. The process involves mixing solutions containing aluminum and silicon and flowing the mixture to a crystallization reactor to crystallize zeolite A. U.S. Pat. No. 5,389,358 discloses a process for synthesizing zeolites by first nucleating crystals and then adding solutions which contain the reactants followed by aging in order to crystallize the zeolite. Finally, U.S. Pat. No. 3,425,800 describes a continuous process for synthesizing zeolite A or X in which aqueous solutions of the reactants are mixed to form a gel, the gel is heated and then supplied to a stratified crystallization zone where the crystals form.

C. S. Cundy et al., in Zeolites, Vol. 15, 353–372 (1995), discloses a process for synthesizing the zeolite ZSM-5. The process involves filling a reactor with a slurry of seed crystals in a suitable liquid. To this mixture there are continuously added sources of aluminum and silicon with intermittent removal of product such that the reactor is filled to a constant level. In a second article by the same authors Zeolites, Vol. 15, 400–407 (1995), it is disclosed that when aluminum and silicon are added at a faster rate than crystal growth, a high nucleation rate is observed.

Finally, U.S. Pat. No. 6,773,694 B1 discloses a process for synthesizing molecular sieves by adding to a slurry of seed crystals nutrients which are sources of the framework elements, e.g. Al, Si of the molecular sieve. Nutrients are added at a rate which essentially equals the crystal growth rate such that no gel is formed and there is no nucleation of new crystals.

SUMMARY OF THE INVENTION

As stated, this invention relates to a process for the synthesis of molecular sieves. Accordingly, one embodiment of the invention is a process for synthesizing a molecular sieve having a three-dimensional microporous framework structure and a framework composition represented by an empirical formula of:

$$(Al_xSi_{1-x})O_2$$

where Al and Si are framework elements present as tetrahedral oxide units, x has a value from 0 to about 0.5; the process comprising forming a reaction mixture comprising reactive sources of the framework elements, M and optionally R, where M is selected from the group consisting of alkali metal, an alkaline earth metal and mixtures thereof, R is an organic templating agent selected from the group consisting of quaternary ammonium salts, amines and mixtures thereof, the reaction mixture having a composition expressed in terms of mole ratios of the oxides of:

$$aM_{2/n}O:bR:Al_2O_3:cSiO_2:dH_2O$$

where "a/c" has a value from 0 to about 4, "n" is the valence of M and has a value from about 1 to about 2, "b/c" has a value from 0 to about 4 "d/c" has a value of about 2 to about 200, and reacting the reaction mixture at reaction conditions which include a temperature of about 50° C. to about 250° C. for a period of about 4 hours to about 14 days to at least partially crystallize molecular sieve seed crystals and provide a seed crystal slurry; adding to the seed slurry, at growing conditions, nutrients, to provide framework elements of the seed crystals thereby growing the seed crystals; carrying out the addition at a rate that essentially equals the crystal growth rate and for a time sufficient to produce the molecular sieve.

Another embodiment of the invention is to use the process described in the previous paragraph to prepare a molecular sieve represented by an empirical formula of:

$$(El_wAl_xP_ySi_z)O_2$$

where El, Al, P and Si are framework elements present as tetrahedral oxide units, "w" is the mole fraction of El and has a value from 0 to about 0.5, "x" is the mole fraction of Al and has a value from 0 to about 0.5, y' is the mole fraction of P and has a value from greater than 0 to about 0.5, and "z" is the mole fraction of Si and has a value from 0 to about 0.98, w+x+y'+z=1 and the reaction mixture has a composition expressed in terms of the mole ratios of the oxides of:

$$b'R:c'El_2O_3:d'Al_2O_3:e'P_2O_5:fSiO_2:gH_2O$$

where b'/e' has a value from about 0.4 to about 7, c'/e' has a value from about 0 to about 0.5, d'/e' has a value from about 0.2 to about 1.6, f/e' has a value from about 0 to about 3.6, g/e' has a value from about 4 to about 200.

Yet another embodiment of the invention is a process for synthesizing a microporous molecular sieve having a three dimensional structure comprising a core molecular sieve and an outer molecular sieve, both molecular sieves having the same framework structure, the core molecular sieve having a composition represented by an empirical formula of:

$$(Al_xSi_{1-x})O_2$$

where Al and Si are framework elements, present as tetrahedral oxide units, and x has a value from 0 to about 0.5; the process comprising forming a reaction mixture and reacting the mixture to provide seed crystals of the core molecular sieve; adding to the reaction mixture containing seed crystals, at growing conditions, nutrients to provide framework elements, thereby growing an outer molecular sieve over the crystals, the outer molecular sieve having the same framework structure as the core molecular sieve but the core and outer molecular sieve differing by at least one framework element, the outer molecular sieve having a composition represented by the empirical formula:

$$(El_wAl_xP_ySi_z)O_2$$

where El, Al, P and Si are framework elements present as tetrahedral oxide units, "w" is the mole fraction of El and has a value from 0 to about 0.5, "x" is the mole fraction of Al and has a value of 0 to about 0.5, "y" is the mole fraction of P and has a value from 0 to about 0.5, and "z" is the mole fraction of Si and has a value from 0 to about 1, w+x+y+z=1 and "y" and "z" are not simultaneously zero; carrying out the addition at a rate that essentially equals the growth rate of the outer molecular sieve and for a time sufficient to produce the molecular sieve.

A further embodiment of the invention is a process for synthesizing a microporous molecular sieve having a three dimensional structure comprising a core molecular sieve and an outer molecular sieve, both molecular sieves having the same framework structure, the core molecular sieve having a composition represented by an empirical formula of:

$$(El_wAl_xP_{y'}Si_z)O_2$$

where El, Al, P and Si are framework elements present as tetrahedral oxide units, "w" is the mole fraction of El and has a value from 0 to about 0.5, "x" is the mole fraction of Al and has a value from 0 to about 0.5, y' is the mole fraction of P and has a value from greater than 0 to about 0.5, and "z" is the mole fraction of Si and has a value from 0 to about 0.98, w+x+y'+z=1, the process comprising forming a reaction mixture and reacting the mixture to provide seed crystals of the core molecular sieve; adding to the reaction mixture containing seed crystals at growing conditions, nutrients to provide framework elements thereby growing an outer molecular sieve over the crystals, the outer molecular sieve having the same framework structure as the core molecular sieve but the core and outer molecular sieve differing by at least one framework element, the outer molecular sieve having a composition represented by the empirical formula:

$$(El_wAl_xP_ySi_z')O_2$$

where El, Al, P and Si are framework elements present as tetrahedral oxide units, "w" is the mole fraction of El and has a value from zero to about 0.5, "x" is the mole fraction of Al and has a value from 0 to about 0.5, "y" is the mole fraction of P and has a value from 0 to about 0.5, and "z" is the mole fraction of Si and has a value from 0 to about 1, w+x+y+z=1 and "y" and "z" are not simultaneously zero; carrying out the addition at a rate that essentially equals the growth rate of the outer molecular sieve and for a time sufficient to produce the molecular sieve.

These and other objects, embodiments and details of this invention will become apparent after a detailed description of the invention.

DETAILED DESCRIPTION OF THE INVENTION

The process of the present invention relates to growing molecular sieve crystals from seed crystals with substantially no nucleation of new crystals. In one embodiment of the invention, the same molecular sieve as the seeds, i.e. same framework elements and structure but not necessarily the same ratio of those elements, will grow around the seed crystals. In another embodiment, the molecular sieve grown around the seed crystals will have the same framework structure, but not the same framework elements, i.e. at least one element will be different.

Accordingly, one essential element of the present invention is a molecular sieve seed crystal. Molecular sieves are microporous compositions with a three dimensional framework which have crystallographically uniform pores. These sieves are classified as either zeolitic or non-zeolitic molecular sieves. Zeolites are alumino-silicate compositions in which the framework structure is composed of $SiO_2$ and $AlO_2$ tetrahedral oxides. Non-zeolitic molecular sieves are those which contain elements other than aluminum and silicon. Examples include silicoaluminophosphates and aluminophosphate molecular sieves. The zeolitic and non-zeolitic molecular sieves which can be prepared using the process of the present invention have a three dimensional framework structure and a framework composition represented by the general empirical formula:

$$(El_wAl_xP_ySi_z)O_2 \qquad (I)$$

where El is an element capable of forming a three-dimensional framework oxide unit as described below, and P, Al and Si are also framework elements present as tetrahedral oxide units. The mole fraction of El is represented by "w" and has a value from 0 to about 0.5, "x" is the mole fraction of Al and has a value from 0 to about 0.5, "y" is the mole fraction of P and has a value from 0 to about 0.5 and "z" is the mole fraction of Si and has a value from 0 to about 1, w+x+y+z=1 and "y" and "z" are not simultaneously zero. When "El" comprises two or more elements, "w" represents the mole fraction of said elements ($El_1$, $El_2$, $El_3$, $El_4$ etc.) and "w" equals the sum of "$w_1$", "$w_2$", "$w_3$", "$w_4$", etc. which represents, respectively, the mole fractions of $El_1$, $El_2$, $El_3$, $El_4$ etc. These molecular sieves have been given the acronym ELAPSO and are described in detail in U.S. Pat. No. 4,793,984 which is incorporated in its entirety by reference. The criteria for selecting the El element is also presented in the '984 patent. The El is characterized by at least one of the following criteria:

1) "El" is characterized by an electronic orbital configuration selected from the group consisting of $d^0$, $d^1$, $d^2$, $d^5$, $d^6$, $d^7$, or $d^{10}$ where the small crystal field stabilization energy of the metal ligand "—O—El" favors tetrahedral coordination of element El with $O^{2-}$, as discussed in "Inorganic Chemistry" J. E. Huheey, Harper Row, p. 348 (1978):

2) "El" is characterized as capable of forming stable oxo or hydroxo species in aqueous solutions as evidenced by a first hydrolysis constant, $K_{11}$, greater than $10^{-14}$, as discussed in "The Hydrolysis of Cations", C. F. Baes and R. E. Mesmer, John Wiley & Sons (1976);

3) "El" is selected from the group of elements known to occur in crystal structure types geometrically related to the different silica modifications, quartz, cristobalite or tridymite, as discussed in E. Parthe, "Crystal Chemistry of Tetrahedral Structures", Gordon and Breach, New York, London, pp. 66–68 (1964); and 4) "El" is an element, which in its cation form is classified by Pearson. (J. E. Huheey, "Inorganic Chemistry", Harper & Row, p. 276 (1978) as "hard" or "borderline" acids which interact with the "hard" base $O^{2-}$ to form more stable bonds than the cations classified as "soft" acids. Specific elements include but are not limited to arsenic, beryllium, boron, chromium, cobalt, nickel, gallium, germanium, iron, lithium, magnesium, manganese, titanium, vanadium, tin and zinc.

From the general formula described above, several classes of molecular sieves can be described and prepared. For example, when "w" and "y" are both zero, the molecular sieves are zeolites or zeolitic molecular sieves. In this case formula (I) becomes $$(Al_xSi_{1-x})O_2 \qquad (II)$$

where x has a value from 0 to about 0.5. Specific examples of the zeolites which can be prepared by the present invention include but are not limited to zeolite A, zeolite X, mordenite, silicalite, zeolite beta, zeolite Y, zeolite L, ZSM-12, UZM-4 and UZM-5. UZM-4 and UZM-5 are described in WO 02/36491 and WO 02/36489 respectively which are incorporated in their entirety by reference. When x is zero, the zeolite is silicalite. In the case where "x" in formula (I) is greater than zero one obtains formula (III)

$$(El_wAl_xP_ySi_z)O_2 \qquad (III)$$

where "w", "y" and "z" are defined as in formula (I) and x' has a value from greater than 0 to about 0.5. Further, when "w" and "z" are zero in formula (III) or when "w" and "z" are zero and "x" is greater than 0 in formula (I), one obtains the ALPO family of non-zeolitic molecular sieves which are described in detail in U.S. Pat. No. 4,310,440 and U.S. Pat. No. 4,500,651, both of which are incorporated in their entirety by reference. Further, when "w" is zero and "z" is greater than zero in formula (I) or (III) (and "x" is greater than zero in formula (I)) then one obtains the SAPO family of non-zeolitic molecular sieves non-limiting examples of which are SAPO-34 and SAPO-11 which are described in U.S. Pat. No. 4,440,871 which is incorporated in its entirety by reference. When "z" is zero and all other subscripts in either formula (I) or (III) are greater than zero, one has the ElAPO family of non-zeolitic molecular sieves. Finally, when all subscripts in formula (1) or (E) are greater than zero, one has the ElAPSO family of non-zeolitic molecular sieves described above, one example of which is MAPSO-31.

In addition to the framework elements, the molecular sieves in the as-synthesized and anhydrous state will contain in their pores some of the templating agent which was used to prepare the molecular sieve. These templating agents are well known in the art and include but are not limited to alkali metals, alkaline earth metals and organic compounds. The organic compounds are any of those well known in the art and include but are not limited to amines such as piperdine, tripropylamine, dipropylamine, diethanolamine, triethanolamine, cyclohexylamine and quaternary ammonium compounds such as the halide or hydroxide compound of tetramethylammonium, tetrabutyl ammonium, tetraethylammonium and tetrapropylammonium ions.

The first step in the process of the present invention involves the preparation of molecular sieve seed crystals. The seed crystals of any of the molecular sieves described above can be prepared by conventional methods, described in the patents cited and incorporated above, which involve mixing reactive sources of the framework elements, e.g. aluminum source, silicon source and at least one templating structure directing agent, plus water in a vessel and heating to a temperature (with or without pressure) until crystalline product is obtained. For the molecular sieves represented by formula (II), the reaction mixture will have a composition expressed in terms of the mole ratios of the oxides of:

$$aM_{2/n}O:bR:Al_2O_3:cSiO_2: dH_2O$$

where "a/c" has a value from 0 to about 4 and preferably from 0 to about 2, "n" is the valence of M and has a value from about 1 to about 2, "b/c" has a value from 0 to about 4 and preferably from 0 to about 2, "d/c" has a value of about 2 to about 200 and preferably from about 10 to about 50, and reacting the reaction mixture at reaction conditions which include a temperature of about 50° C. to about 200° C. for a period of about 4 hours to about 14 days to at least partially crystallize molecular sieve seed crystals and provide a seed crystal slurry; adding to the seed slurry, at growing conditions, nutrients, to provide framework elements of the seed crystals thereby growing the seed crystals; carrying out the addition at a rate that essentially equals the crystal growth rate and for a time sufficient to produce the molecular sieve. For the molecular sieves represented by formula (III), the composition of the reaction mixture is expressed by the empirical formula expressed in terms of the mole ratios of the oxides of:

$$b'R:c'El_2O_3:d'Al_2O_3:e'P_2O_5:fSiO_2:gH_2O$$

where b'/e' has a value from about 0.4 to about 7 and preferably from about 0.8 to about 3.2, c'/e' has a value from 0 to about 0.5 and preferably from 0 to about 0.3, d'/e' has a value from about 0.2 to about 1.6 and preferably from about 0.6 to about 1.4, f/e' has a value from 0 to about 3.6 and preferably from 0 to about 1.0, g/e' has a value from about 4 to about 200 and preferably from about 20 to about 80.

The sources of aluminum include aluminum alkoxide, pseudoboehmite, gibbsite, colloidal alumina, alumina sol, sodium aluminate, aluminum trichloride and aluminum chlorohydrate. Of the above, preferred aluminum sources are pseudoboehmite, sodium aluminate and aluminum alkoxides such as aluminum isopropoxide. Silicon sources include silica sol, colloidal silica, fumed silica, silica gel, silicon alkoxides, silicic acid and alkali metal silicate such as sodium silicate. Phosphorus sources include phosphoric acid and organic phosphates such as triethylphosphate.

The element(s) "El" can be introduced into the reaction system in any form which permits the formation in situ of a reactive form of the element, i.e., reactive to form a framework oxide unit of element "El". Compounds of element(s) "El" which may be employed include oxides, hydroxides, alkoxides, nitrates, sulfates, halides, carboxylates, and mixtures thereof. Representative compounds which may be employed include without limitation: carboxylates of arsenic and beryllium; cobalt chloride hexahydrate, alpha cobaltous iodide; cobaltous sulfate; cobalt acetate; cobaltous bromide; cobaltous chloride; boron alkoxides; chromium acetate; gallium alkoxides; zinc acetate; zinc bromide; zinc formate; zinc iodide; zinc sulfate heptahydrate; germanium dioxide; iron (II) acetate; lithium acetate; magnesium acetate; magnesium bromide; magnesium chloride; magnesium iodide; magnesium nitrate; magnesium sulfate; manganese acetate; manganese bromide; manganese sulfate; titanium tetrachloride; titanium carboxylates; titanium acetate; zinc acetate; tin chloride; and the like.

When the templating/structure directing agent is an alkali or alkaline earth metal cation, the sources include without limitation the hydroxides, e.g. sodium hydroxide and the halides. If the templating agent is a quaternary ammonium cation, then the sources include without limitation the hydroxide and halide compounds as stated above. Finally, sufficient water is added to obtain a workable mixture.

The reaction mixture is now heated up to a reaction temperature either under autogenous pressure or added pressure and either with or without stirring. Specific reaction conditions for the various molecular sieves enumerated above are known and disclosed in the various patents enumerated above and incorporated by reference.

For completeness, the general reaction or crystallization conditions include a temperature of about 50° C. to about 200° C. for molecular sieves of formula (II) and about 50° C. to about 250° C. for molecular sieves of formula (III). The reaction mixture is maintained at the desired temperature for a time sufficient to at least partially produce molecular sieve seed crystals. Although the mixture could be reacted to completely crystallize all the molecular sieve seed crystals possible, it is not necessary to do so in order to carry out the invention. However, there may be cases where it is desirable to fully crystallize the reaction mixture. The amount of time to at least partially form molecular sieve seed crystals can vary widely but is usually from about 1 hour to about 48 hours for the molecular sieves of formula (III) and from about 4 hours to about 14 days for the molecular sieves of formula (II).

The reaction mixture comprising seed crystals, i.e. seed slurry is now the starting mixture or slurry for the second step of the process. To this seed slurry sources of the desired framework elements, hereinafter referred to as nutrients, are added to grow a molecular sieve on the seed crystals. Thus the nutrient or combination of nutrients which are added are any of those which can form a molecular sieve. These combinations are: 1) silicon source; 2) aluminum and silicon sources, 3) aluminum, phosphorus and silicon sources; 4) aluminum and phosphorus sources; 5) El, aluminum and phosphorus sources; and 6) El, aluminum, silicon and phosphorus sources. It should also be pointed out that additional templating agent/structure directing agent may need to be added. This can be done by adding the desired source of the agent with one of the nutrients or as a separate stream. In some cases the seed slurry may contain excess unreacted templating agent, thereby making the overall process more economical by using up this excess template during the second step, i.e. growth step, of the process.

The nutrients which are added can be those which will provide the same molecular sieve as the seed crystal or a different molecular sieve. Even if the same molecular sieve is formed, the ratio of nutrients and thus the ratio of framework elements can vary between the seed crystals and the molecular sieve subsequently grown on the seed crystals. For example, to seed crystals of zeolite X at a Si/Al of 1.25 there can be added silicon and aluminum nutrients at concentrations to grow zeolite X on the seed crystals, but at a Si/Al of 1.0.

In the case where the seed crystals and the molecular sieve grown on the seed crystals have different framework elements, it is necessary that the seed crystal or core molecular sieve and the outer molecular sieve have the same framework structure. It is only necessary that the core and outer molecular sieve differ by at least one framework element. For example, the core molecular sieve can be AlPO-34 and the outer molecular sieve can be SAPO-34, chabazite, CoAPO-44, LZ-218, GaAPO-34, zeolite Phi, etc. The molecular sieves which have the same structure can be determined by consulting W. M. Meier, D. H. Olson and Ch. Baulocher, *Atlas of Zeolite Structure Types*, Fifth Revised Edition, Elsevier, Amsterdam, 2001 or Ch. Baulocher and L. B. McCusker, Database of Zeolite Structures, http://www.iza-structure.org/databases/. It should be pointed out that in some molecular sieve systems intergrowth of two or more frameworks can occur. Thus as a molecular sieve grows on a core, instead of a pure framework type, an intergrowth of two or more frameworks grows. For example if a SAPO-34 layer is grown on a core, the layer may be substantially CHA structure with minor amounts of AEI. Of course it is desirable and preferred to grow one pure framework.

It can be seen from the foregoing that one can prepare a molecular sieve which has numerous layers of different composition. In this case, the core molecular sieve would be made up of several layers with the final layer being the outer molecular sieve. By using the instant process, one can also produce a molecular sieve having the same framework elements throughout the crystal, but have layers of different ratios of framework elements, e.g. Si/Al ratio. Thus, one can start with a ZSM-5 core, increase the Si/Al ratio in steps in the next layers and finally have a silicalite layer as the outer layer.

Regardless of the choice of nutrients, they can be added by any convenient means. These means include preparing solutions of the nutrients, preparing solid suspensions or slurries, adding solids directly and adding neat nutrients. Of course one nutrient can be added by one method, while other nutrient(s) can be added by another method. Additionally, depending on the particular nutrient additional acid or base may need to be added to arrive at the desired pH. For example when sodium silicate is used as the nutrient or source of silicon, acid may need to be added to neutralize the sodium hydroxide which may be generated.

When more than one nutrient is added, e.g. Si and Al, they can be added simultaneously or sequentially. By using sequential addition, one need use only one pump in the case of liquids or slurries. Simultaneous addition can be carried out in one of three ways. First, each nutrient is fed into the reactor containing the seed slurry using individual ports or injectors. Second, the individual nutrients can be fed into a holding tank, mixed and then fed as one stream into the reactor containing the seed slurry. Third, the nutrients can be combined to form a minimum number of streams, wherein the constituents of each stream are chosen to minimize undesirable reactions in each stream prior to final addition. Finally, the nutrients can be added continuously or intermittently. If intermittently, the addition can be at regular intervals or at irregular intervals. Whether added continuously or intermittently, it is necessary that the nutrients be added at a rate such that the seed or core crystals will grow without substantially any further nucleation of new crystals or the formation of amorphous solids. By "nucleation of new crystals" is meant the formation of crystals from the mixture when the concentration of the nutrients is above the critical supersaturation concentration. The growth of the seed crystals into larger crystals is not considered to be "nucleation of new crystals". In order to accomplish this the addition rate of the nutrients must be essentially the same as the crystal growth rate. One way to determine the addition rate is to first determine the crystal size of the seed crystals by methods such as Scanning Electron Microscopy (SEM). Next, it is assumed that the crystal growth (determined empirically) is uniform and linear and that the crystals are cubes. From this feed, rates can be calculated.

Another way to control the amount of nutrients to be added is to keep the concentration of each nutrient above the saturation limit, but below the critical supersaturation limit. If the concentration is above the critical supersaturation limit, then nucleation of new crystals will begin, whereas if the concentration is at or below the saturation limit, then no growth occurs.

The reaction conditions for growing the crystals are the same as those used in conventional processes and include autogenous pressure and a temperature of about room temperature (20° C.) to about 250° C. Higher pressures can be used and usually can be as high as 300 psig. Addition of nutrients is continued until the desired crystal size is obtained. The size of the seed crystals can vary considerably and is not a critical parameter of this invention. Although any size seed crystal can be used, typically the seed crystallite size ranges from about 10 nanometers to about five micrometers. There is also no upper limit to the final crystallite size of the product, but crystallites as large as 10 micrometers can be formed. Once the desired crystal size is obtained, nutrient addition is stopped and the molecular sieve solid is separated from the aqueous phase or mother liquor by methods well known in the art such as filtration, centrifugation, etc.

While the crystal size is determined by the amount of the nutrients added, the crystals themselves can agglomerate or aggregate into particles. Thus, particles can be bigger than any one individual crystal. Control of the particle size, i.e., degree of agglomeration, is achieved by applying shear to the reaction mixture. Shear can be applied by mechanical means, hydraulic means etc. Specific methods of applying shear include but are not limited to stirrers, impellers, ultrasound, opposed jets, etc. These means are meant to break apart agglomerates but they can also break apart individual crystals which can grow further. The breakup of individual crystals is not nucleation.

Crystal size and/or particle size distribution can be controlled by adding more seed crystals during the process. This can be done once, intermittently or continuously throughout the process. Additionally, the seed crystals which are added later can be larger than the initial seed crystals, thus providing a narrow crystal and/or particle size distribution. Alternatively, the seed crystals which are added later can be smaller than the initial seed crystals, thus providing a broader crystal and/or particle size distribution.

The following examples are set forth to illustrate the invention. It is to be understood that the examples are only by way of illustration and are not intended as an undue limitation on the broad scope of the invention as set forth in the appended claims.

EXAMPLE 1

A SAPO-34 molecular sieve was prepared as follows. A reaction mixture having a total weight of 500 grams and having the following composition was prepared.

$$Al_2O_3 : 0.2\ SiO_2 : P_2O_5 : 2\ TEAOH : 63.8 H_2O$$

TEAOH is tetraethylammonium hydroxide. This mixture was prepared by combining in order 85% orthophosphoric acid, $H_2O$, 35% TEAOH, Ludox™ AS-40, and Versal™ 250 alumina. The mixture was heated to 100° C. and held there for one hour. Subsequently it was heated to 175° C. and held there for two (2) hours. To this partially crystallized reaction mixture there were added two nutrient feeds over a 15 hour time period at 175° C. The first feed weighed 446.8 grams and had a composition of: 2.3% $SiO_2$; 27.5% $P_2O_5$; 27.4% DEA; and 42.8% $H_2O$. DEA is diethanolamine. The second feed weighed 443.2 grams and had a composition of 20% $Al_2O_3$ and 80% $H_2O$. The final gel composition was as follows:

$$Al_2O_3 : 0.2SiO_2 : P_2O_5 : 0.5\ TEAOH : DEA : 42.1H_2O$$

At the end of the 15 hour addition period, the reactor was cooled to room temperature and the product isolated by centrifugation, washed and dried to provide 199.0 g of powder which was identified by x-ray diffraction as SAPO-34. Elemental analysis of the dried powder showed (wt %): 22.00 Al, 23.00 P, 2.63 Si, 10.9 C, 1.5 N. This corresponds to $Al_{0.494}P_{0.450}Si_{0.057}O_2$, expressed as normalized mole fraction.

EXAMPLE 2

A SAPO-34 molecular sieve was prepared as follows. A reaction mixture having a total weight of 500 grams and having the following composition was prepared.

$$Al_2O_3 : 0.1\ SiO_2 : P_2O_5 : TEAOH : 35H_2O$$

TEAOH is tetraethylammonium hydroxide. This mixture was prepared by combining in order 85% orthophosphoric acid, $H_2O$, 35% TEAOH, Ludox AS-40, and Versal 250 alumina. Additionally, 18.0 grams of SAPO-34 seed were added to this mixture. The mixture was heated to 100° C. in five hours and held there for nine hours. Subsequently it was heated to 175° C. in six hours and held there for two (2) hours. To this partially crystallized reaction mixture there were added two nutrient feeds over a 15 hour time period at 175° C. The first feed weighed 507.4 grams and had a composition of: 0.8% $SiO_2$; 20.6% $P_2O_5$; 13.2% DEA; 4.0% TEAOH and 61.4% $H_2O$. DEA is diethanolamine. The second feed weighed 374.6 grams and had a composition of 20% $Al_2O_3$ and 80% $H_2O$. The final gel composition was as follows:

$$Al_2O_3 : 0.1SiO_2 : P_2O_5 : 0.5\ TEAOH : 0.5\ DEA : 40.0H_2O$$

At the end of the 15 hour addition period, the reactor was cooled to room temperature and the product isolated by centrifugation, washed and dried to provide 268.9 g of powder which was identified by x-ray diffraction as SAPO-34 with some AEI intergrowth. Elemental analysis of the dried powder showed (wt %): 22.50 Al, 23.60 P, 2.05 Si, 10.8 C, 1.4 N. This corresponds to $Al_{0.500}P_{0.457}Si_{0.044}O_2$, expressed as normalized mole fraction.

EXAMPLE 3

A SAPO-34 molecular sieve was prepared as follows. A reaction mixture having a total weight of 500 grams and having the following composition was prepared.

$$Al_2O_3 : 0.2SiO_2 : P_2O_5 : 2\ TEAOH : 63.8H_2O$$

TEAOH is tetraethylammonium hydroxide. This mixture was prepared by combining in order 85% orthophosphoric acid, H₂O, 35% TEAOH, Ludox AS-40, and Versal 250 alumina. The mixture was heated to 100° C. and held there for one hour. Subsequently it was heated to 175° C. and held there for two (2) hours. To this partially crystallized reaction mixture there were added two nutrient feeds over a 15 hour time period at 175° C. The first feed weighed 446.8 grams and had a composition of: 0.8% $SiO_2$; 27.5% $P_2O_5$; 13.7% DEA and 58.0% $H_2O$. DEA is diethanolamine. The second feed weighed 443.2 grams and had a composition of 20% $Al_2O_3$ and 80% $H_2O$. The final gel composition was as follows:

$$Al_2O_3:0.1SiO_2:P_2O_5:0.5\ TEAOH:0.5\ DEA:45.3H_2O$$

At the end of the 15 hour addition period, the reactor was cooled to room temperature and the product isolated by centrifugation, washed and dried to provide 264.2 g of powder which was identified by x-ray diffraction as SAPO-34 with a small amount of AEI intergrowth. Elemental analysis of the dried powder showed (wt %): 23.20 Al, 23.50 P, 1.31 Si, 10.2 C, 1.6 N. This corresponds to $Al_{0.516}P_{0.456}Si_{0.028}O_2$, expressed as normalized mole fraction.

EXAMPLE 4

A SAPO-34 molecular sieve was prepared as follows. A reaction mixture having a total weight of 500 grams and having the following composition was prepared.

$$Al_2O_3:0.2SiO_2:P_2O_5:2\ TEAOH:63.8H_2O$$

TEAOH is tetraethylammonium hydroxide. This mixture was prepared by combining in order 85% orthophosphoric acid, H₂O, 35% TEAOH, Ludox AS-40, and Versal 250 alumina. The mixture was heated to 100° C. in five hours and held there for nine hours. Subsequently it was heated to 175° C. in six hours and held there for two (2) hours. To this partially crystallized reaction mixture there were added two nutrient feeds over a 15 hour time period at 175° C. The first feed weighed 446.8 grams and had a composition of: 0.7% $SiO_2$; 27.5% $P_2O_5$; 27.4% DEA and 44.4% $H_2O$. DEA is diethanolamine. The second feed weighed 443.2 grams and had a composition of 20% $Al_2O_3$ and 80% $H_2O$. The final gel composition was as follows:

$$Al_2O_3:0.1SiO_2:P_2O_5:0.5\ TEAOH:DEA:45.3H_2O$$

At the end of the 15 hour addition period, the reactor was cooled to room temperature and the product isolated by centrifugation, washed and dried to provide 165.5 g of powder which was identified by x-ray diffraction as essentially pure SAPO-34 with a very small amount of AEI intergrowth.

EXAMPLE 5

A BETA molecular sieve was prepared as follows. A reaction mixture having a total weight of 600 grams and having the following composition was prepared.

$$Al_2O_3:58.5\ SiO_2:2.57\ Na_2O:21.5\ TEAOH:800H_2O$$

TEAOH is tetraethylammonium hydroxide. This mixture was prepared by combining in order sodium hydroxide, H₂O, sodium aluminate, 35% TEAOH and Ludox AS-40. The mixture was stirred for 12 hours. Subsequently it was heated to 150° C. and held there for twenty four (24) hours. To this partially crystallized reaction mixture there were added two nutrient feeds over a 12 hour time period at 150° C. The first feed weighed 384.9 grams and had a composition of: 32% $SiO_2$; 0.12% $Na_2O$; and 67.88% $H_2O$. The second feed weighed 284.9 grams and had a composition of 3.13% $Al_2O_3$; 2.94% $Na_2O$ and 93.93% $H_2O$. The final gel composition was as follows:

$$Al_2O_3:29.36\ SiO_2:1.8\ Na_2O:5.2\ TEAOH:448H_2O$$

At the end of the 12 hour addition period, the reactor was cooled to room temperature and the product isolated by centrifugation, washed and dried to provide 189.7 g of powder which was identified by x-ray diffraction as Beta Zeolite.

We claim as our invention:

1. A process for synthesizing a molecular sieve having a three dimensional microporous framework structure and a framework composition represented by an empirical formula of:

$$(Al_xSi_{1-x})O_2$$

where Al and Si are framework elements present as tetrahedral oxide units, x has a value from 0 to about 0.5; the process comprising forming a reaction mixture comprising reactive sources of the framework elements, M and optionally R, where M is selected from the group consisting of alkali metals, alkaline earth metals and mixtures thereof, R is an organic templating agent selected from the group consisting of quaternary ammonium cations, amines and mixtures thereof; the reaction mixture having a composition expressed in terms of mole ratios of the oxides of:

$$aM_{2/n}O:bR:Al_2O_3:cSiO_2:dH_2O$$

where "a/c" has a value from 0 to about 4, "n" is the valence of M and has a value from about 1 to about 2, "b/c" has a value from 0 to about 4, "d/c" has a value of about 2 to about 200, and reacting the reaction mixture at reaction conditions which include a temperature of about 50° C. to about 200° C. for a period of about 4 hours to about 14 days to at least partially crystallize molecular sieve seed crystals and provide a seed crystal slurry; adding to the seed slurry, at growing conditions, nutrients (sources) to provide framework elements of the seed crystals thereby growing the seed crystals; carrying out the addition at a rate that essentially equals the crystal growth rate and for a time sufficient to produce the molecular sieve.

2. The process of claim 1 where the growing conditions include a temperature of about 20° C. to about 250° C. and autogenous pressure.

3. The process of claim 1 where the aluminum source is selected from the group consisting of sodium aluminate, colloidal alumina, alumina sol, pseudoboehmite, aluminum alkoxides and mixtures thereof.

4. The process of claim 1 where the silicon source is selected from the group consisting of sodium silicate, fumed silica, silica gel, silica sol, silicon alkoxide and mixtures thereof.

5. The process of claim 1 where the molecular sieve has a structure selected from the group consisting of zeolite A, zeolite X, mordenite, silicalite, zeolite beta, zeolite Y, zeolite L, ZSM-12, UZM-4 and UZM-5.

6. The process of claim 1 where the nutrients are continuously added.

7. The process of claim 1 where the nutrients are intermittently added.

8. The process of claim 1 where the nutrients comprise an aluminum source and a silicon source.

9. The process of claim 8 where the nutrients are simultaneously added.

10. The process of claim 8 where the nutrients are sequentially added.

11. The process of claim 1 where additional seed crystals are added to the slurry.

12. A process for synthesizing a molecular sieve having a three dimensional microporous framework structure and a framework composition represented by an empirical formula of:

$$(El_{w'}Al_xP_{y'}Si_z)O_2$$

where El, Al, P and Si are framework elements present as tetrahedral oxide units, "w" is the mole fraction of El and has a value from 0 to about 0.5, "x" is the mole fraction of Al and has a value from 0 to about 0.5, y' is the mole fraction of P and has a value from greater than 0 to about 0.5, and "z" is the mole fraction of Si and has a value from 0 to about 0.98, w+x+y'+z=1, the process comprising forming a reaction mixture comprising reactive sources of the framework elements and R, where R is an organic templating agent selected from the group consisting of quaternary ammonium cations, amines and mixtures thereof: the reaction mixture having a composition expressed in terms of the mole ratios of the oxides of:

$$b'R: c'El_2O_3: d'Al_2O_3: e'P_2O_5: fSiO_2: gH_2O$$

where b'/e' has a value from about 0.4 to about 7, c'/e" has a value from 0 to about 0.5, d'/e' has a value from about 0.2 to about 1.6, f/e' has a value from 0 to about 3.6, g/e' has a value from about 4 to about 200; reacting the reaction mixture at reaction conditions which include a temperature of about 50° C. to about 250° C. for a period of about 1 hour to about 48 hours to at least partially crystallize molecular sieve seed crystals and provide a seed crystal slurry; adding to the seed slurry, at growing conditions, nutrients (sources) to provide framework elements of the seed crystals thereby growing the seed crystals; carrying out the addition at a rate that essentially equals the crystal growth rate and for a time sufficient to produce the molecular sieve.

13. The process of claim 12 where El is selected from the group consisting of Mg, Ni, As, Ga, Ge, Mn, Co, Sn, Ti, Fe, Cr, Be, B, Li, V, Zn and mixtures thereof.

14. The process of claim 12 where the growing conditions include a temperature of about 20° C. to about 250° C. and autogenous pressure.

15. The process of claim 12 where the aluminum source is selected from the group consisting of sodium aluminate, colloidal alumina, alumina sol, pseudoboehmite, aluminum alkoxides and mixtures thereof.

16. The process of claim 12 where the silicon source is selected from the group consisting of sodium silicate, fumed silica, silica gel, silica sol, colloidal silica, silicon alkoxides and mixtures thereof.

17. The process of claim 12 where the nutrients are continuously added.

18. The process of claim 12 where the nutrients are intermittently added.

19. The process of claim 12 where the nutrients are selected from the group consisting of 1) an aluminum and a phosphorus source; 2) an aluminum, a silicon and a phosphorus source; 3) an El source, an aluminum source and a phosphorous source and 4) an El source, an aluminum source, a phosphorus source and a silicon source.

20. The process of claim 12 where the nutrients are simultaneously added.

21. The process of claim 12 where the nutrients are sequentially added.

22. The process of claim 12 where additional seed crystals are added to the slurry.

23. The process of claim 12 where the molecular sieve has a framework structure selected from the group consisting of SAPO-34, SAPO-11 and MAPSO-31.

24. A process for synthesizing a microporous molecular sieve having a three dimensional structure comprising a core molecular sieve and an outer molecular sieve, both molecular sieves having the same framework structure, the core molecular sieve having a composition represented by an empirical formula of:

$$(Al_xSi_{1-x})O_2$$

where Al and Si are framework elements, present as tetrahedral oxide units, and "x" has a value from 0 to about 0.5; the process comprising forming a reaction mixture comprising reactive sources of the framework elements, M and optionally R, where M is selected from the group consisting of alkali metals, alkaline earth metals and mixtures thereof, R is an organic templating agent selected from the group consisting of quaternary ammonium cations, amines and mixtures thereof; the reaction mixture having a composition expressed in terms of mole ratios of the oxides of:

$$aM_{2/n}O:bR:Al_2O_3:cSiO_2:dH_2O$$

where "a/c" has a value from 0 to about 4, "n" is the valence of M and has a value from about 1 to about 2, "b/c" has a value from 0 to about 4, "d/c" has a value of about 2 to about 200, and reacting the reaction mixture at reaction conditions which include a temperature of about 50° C. to about 200° C. for a period of about 4 hours to about 14 days to at least partially crystallize molecular sieve seed crystals and provide a seed crystal slurry; adding to the slurry nutrients to provide framework elements, thereby growing an outer molecular sieve over the seed crystals, the outer molecular sieve having the same framework structure as the core molecular sieve but the core and outer molecular sieve differing by at least one framework element, the outer molecular sieve having a composition represented by the empirical formula:

$$(El_{w'}Al_xP_{y'}Si_z)O_2$$

where El, Al, P and Si are framework elements present as tetrahedral oxide units, "w" is the mole fraction of El and has a value from 0 to about 0.5, "x" is the mole fraction of Al and has a value from 0 to about 0.5, "y" is the mole fraction of P and has a value from 0 to about 0.5, and "z" is the mole fraction of Si and has a value from 0 to about 1, w+x+y+z=1 and "y" and "z" are not simultaneously zero;

carrying out the addition at a rate that essentially equals the growth rate of the outer molecular sieve and for a time sufficient to produce the molecular sieve.

25. The process of claim 24 where El is selected from the group consisting of Mg, Ni, As, Ga, Ge, Mn, Co, Sn, Ti, Fe, Cr, Be, B, Li, V, Zn and mixtures thereof.

26. The process of claim 24 where the growing conditions include a temperature of about 20° C. to about 250° C. and autogenous pressure.

27. The process of claim 24 where the outer molecular sieve has a framework structure selected from the group consisting of zeolite A, zeolite X, mordenite, silicalite, zeolite beta, zeolite Y, zeolite L, ZSM-12, UZM-4, UZM-5, SAPO-34, SAPO-11 and MAPSO-31.

28. The process of claim 24 where the nutrients are continuously added.

29. The process of claim 24 where the nutrients are simultaneously added.

30. The process of claim 24 where the nutrients are sequentially added.

31. The process of claim 24 where the nutrients are intermittently added.

32. The process of claim 24 where the nutrients are selected from the group consisting of: 1) a silicon source; 2) an aluminum and a silicon source; 3) a phosphorus, an aluminum and a silicon source; 4) a phosphorus and an aluminum source; 5) an El source, an aluminum source and a phosphorus source and 6) an El source, an aluminum source, a phosphorus source and a silicon source.

33. The process of claim 24 where additional seed crystals are added to the slurry.

34. A process for synthesizing a microporous molecular sieve having a three dimensional structure comprising a core molecular sieve and an outer molecular sieve, both molecular sieves having the same framework structure, the core molecular sieve having a composition represented by an empirical formula of:

$$(El_w Al_x P_y Si_z)O_2$$

where El, Al, P and Si are framework elements present as tetrahedral oxide units, "w" is the mole fraction of El and has a value from 0 to about 0.5, "x" is the mole fraction of Al and has a value from 0 to about 0.5, y' is the mole fraction of P and has a value from greater than 0 to about 0.5, and "z" is the mole fraction of Si and has a value from 0 to about 0.98, w+x+y'+z=1, the process comprising forming a reaction mixture comprising reactive sources of the framework elements and R, where R is an organic templating agent selected from the group consisting of quaternary ammonium cations, amines and mixtures thereof, the reaction mixture having a composition expressed in terms of the mole ratios of the oxides of:

$$b'R:c'El_2O_3:d'Al_2O_3:e'P_2O_5:fSiO_2:gH_2O$$

where "b'/e'" has a value from about 0.4 to about 7, "c'/e'" has a value from 0 to about 0.5, "d'/e'" has a value from 0 to about 1.6, "f/e'" has a value from 0 to about 3.6, "g/e'" has a value from about 4 to about 200; reacting the reaction mixture at reaction conditions which include a temperature of about 50° C. to about 250° C. for a period of about 1 hour to about 48 hours to at least partially crystallize molecular sieve seed crystals and provide a seed crystal slurry; adding to the slurry at growing conditions nutrients to provide framework elements thereby growing an outer molecular sieve over the crystals, the outer molecular sieve having the same framework structure as the core molecular sieve, but the core and outer molecular sieve differing by at least one framework element, the outer molecular sieve having a composition represented by the empirical formula:

$$(El_w Al_x P_y Si_z)O_2$$

where El, Al, P and Si are framework elements present as tetrahedral oxide units, "w" is the mole fraction of El and has a value from 0 to about 0.5, "x" is the mole fraction of Al and has a value from 0 to about 0.5, "y" is the mole fraction of P and has a value from 0 to about 0.5, and "z" is the mole fraction of Si and has a value from 0 to about 1, w+x+y+z=1 and "y" and "z" are not simultaneously zero; carrying out the addition at a rate that essentially equals the growth rate of the outer molecular sieve and for a time sufficient to produce the molecular sieve.

35. The process of claim 34 where El is selected from the group consisting of Mg, Ni, As, Ga, Ge, Mn, Co, Sn, Ti, Fe, Cr, Be, B, Li, V, Zn and mixtures thereof.

36. The process of claim 34 where the growing conditions include a temperature of about 20° C. to about 250° C. and autogenous pressure.

37. The process of claim 34 where the outer molecular sieve has a framework structure selected from the group consisting of zeolite A, zeolite X, mordenite, silicalite, zeolite beta, zeolite Y, zeolite L, ZSM-12, UZM-4, UZM-5, SAPO-34, SAPO-11 and MAPSO-31.

38. The process of claim 34 where the nutrients are continuously added.

39. The process of claim 34 where the nutrients are intermittently added.

40. The process of claim 34 where the nutrients are simultaneously added.

41. The process of claim 34 where the nutrients are sequentially added.

42. The process of claim 34 where the nutrients are selected from the group consisting of: 1) a silicon source; 2) an aluminum and a silicon source; 3) a phosphorus, an aluminum and a silicon source; 4) a phosphorus and an aluminum source; 5) an El source, an aluminum source and a phosphorus source and 6) an El source, an aluminum source, a phosphorus source and a silicon source.

43. The process of claim 34 where additional seed crystals are added to the slurry.

* * * * *